United States Patent [19]

Moore

[11] 4,213,626

[45] Jul. 22, 1980

[54] STEERING STABILIZER APPARATUS

[76] Inventor: George B. Moore, 16651 Island Cir., Huntington Beach, Calif. 92649

[21] Appl. No.: 944,832

[22] Filed: Sep. 22, 1978

[51] Int. Cl.² .............................................. B62D 7/06
[52] U.S. Cl. .................................................... 280/94
[58] Field of Search .................... 280/94, 268, 718; 267/150

[56] References Cited

U.S. PATENT DOCUMENTS

| | | | |
|---|---|---|---|
| 2,626,144 | 1/1953 | Stephen | 280/718 |
| 3,448,991 | 6/1969 | Leggett | 280/94 |
| 3,848,885 | 11/1974 | Hefren | 280/94 |
| 3,961,804 | 6/1976 | Blanton | 280/94 |
| 3,980,315 | 9/1976 | Hefren | 280/94 |

*Primary Examiner*—Robert R. Song
*Attorney, Agent, or Firm*—Robert K. Rhea

[57] ABSTRACT

A steering stabilizer apparatus for connection with the steering components of a straight axle vehicle including a spring assembly which biases the steerable wheels of the vehicle toward a neutral position.

3 Claims, 5 Drawing Figures

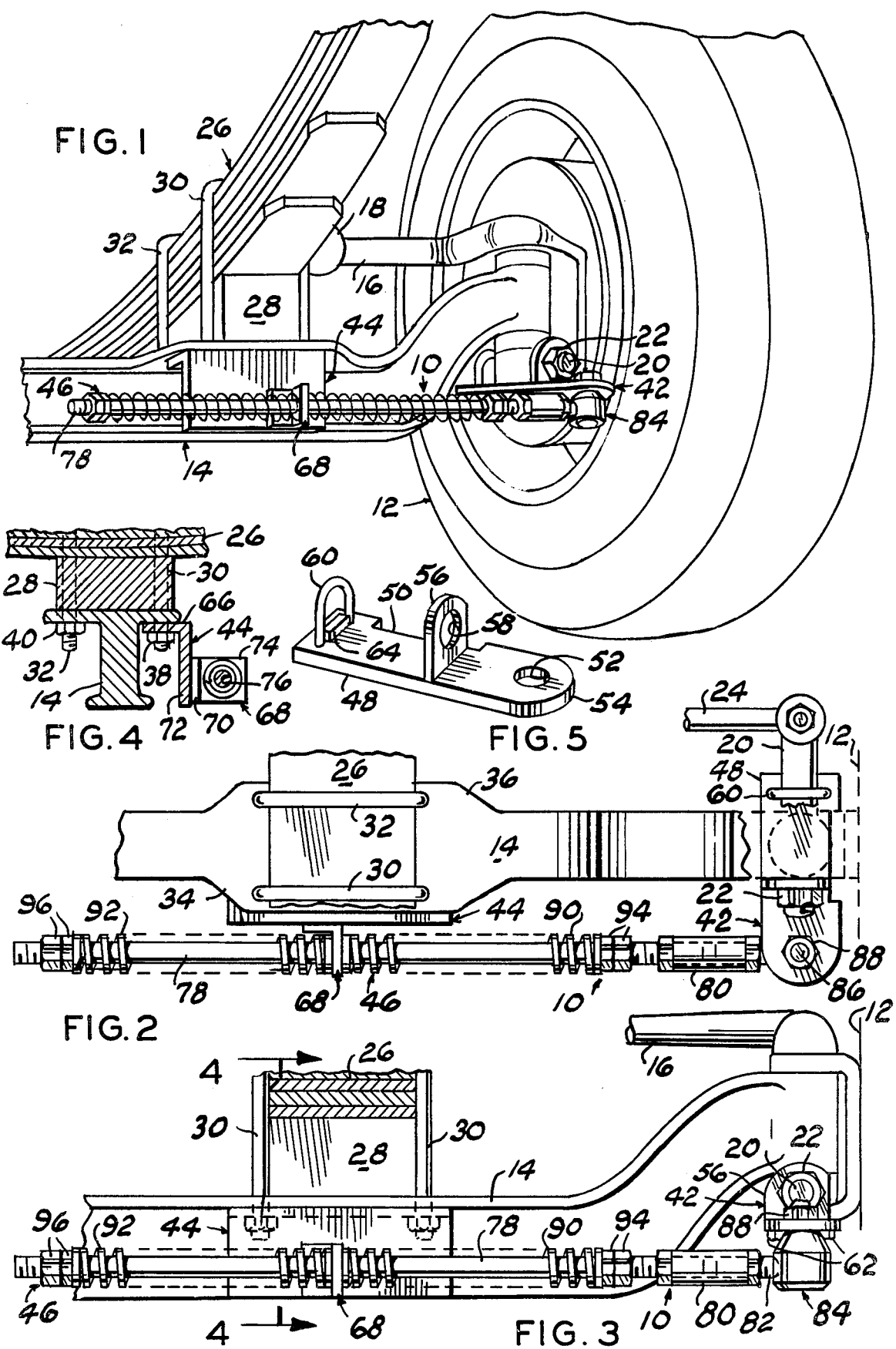

STEERING STABILIZER APPARATUS

BACKGROUND OF THE INVENTION

1. Field of the Invention

The present invention relates to vehicles of the straight axle type and more particularly to a steerable wheel stabilizer for such vehicles.

Motor vehicles, such as trucks, having a one-piece axle mounting a pair of steerable wheels at opposite ends of the axle are steered by suitable steering gear linkage. The steerable wheels are prone to misalignment by failure or movement of their preferred steering adjustment and by wear of their mounting and steering components and due to road shocks which results in uneven tire wear. Periodical adjustment of the steerable wheels must be made which is a prime expense in mechanical maintenance.

2. Description of the Prior Art

U.S. Pat. No. 3,448,991 discloses a vehicle steering control in a precompressed spring assembly connected at one end with the brake drum backing plate forwardly and rearwardly of the turning axis of the respective steerable wheel which requires a modification of the existing vehicle in order to attach the spring assembly.

U.S. Pat. No. 3,848,885 discloses steering stabilizers which are generally clamped to the pitman rods, tie rods and/or intermediate portions of vehicle cross members in which the vehicle cross members must be modified for attaching portions of the stabilizing apparatus. Neither of these patents are readily adaptable for use on vehicles, such as trucks having a single front axle and overlying leaf spring.

This invention, on the other hand, may be readily connected with such a straight axle vehicle without any modification, such as drilling holes or welding any of the stabilizing components to the vehicle support structure or steering components.

SUMMARY OF THE INVENTION

This steering stabilizing apparatus is connected with each steerable wheel of a vehicle and comprises a pitman arm bracket including a U-shaped clamp which is connected with the steerable wheel moved pitman arm behind the existing pitman arm nut and clamped to the pitman arm by the U-shaped clamp. The stabilizing apparatus further includes a mounting bracket which is rigidly connected with the forward leaf spring clamp bolt behind the existing nuts thereon and further includes a shaft horizontally connected at one end by a ball joint, or the like, to the forward end of the pitman bracket and is reciprocably supported, intermediate its ends, by the fixed mounting bracket with a pair of compression springs surrounding the shaft end portions on opposing sides of the fixed mounting bracket with the springs pretensioned by spring retainer nuts on the respective end portions of the shaft. The springs are pretensioned so that the respective steerable wheel is normally urged toward a neutral position for forward movement of the vehicle. Thus, when the steerable wheels are moved in either lateral direction the respective shaft is moved longitudinally relative to the fixed mounting bracket and such movement is resisted by one of the springs being further compressed and the other spring expanding.

The principal object of this invention is to provide a steering stabilizer apparatus for the steerable wheels of a vehicle which may be attached to the pitman arm and leaf spring mounting position of a straight axle vehicle, without any modification of existing vehicle components, or lowering the vehicle roadway clearance, which normally maintains the steerable wheels in a neutral roadway traveling position.

BRIEF DESCRIPTION OF THE DRAWINGS

FIG. 1 is a fragmentary perspective view illustrating the steering stabilizer in operative position on a vehicle;

FIG. 2 is a fragmentary top view, to a larger scale, with parts broken away for clarity;

FIG. 3 is a fragmentary front elevational view of FIG. 2;

FIG. 4 is a fragmentary vertical cross sectional view taken substantially along the line 4—4 of FIG. 3; and, FIG. 5 is a perspective view, to a different scale, of the pitman connecting bracket, per se.

DESCRIPTION OF THE PREFERRED EMBODIMENT

Like characters of reference designate like parts in those figures of the drawings in which they occur.

In the drawings:

The reference numeral 10 indicates the steering stabilizer apparatus, as a whole, connected with and controlling the left front steerable wheel assembly 12 of a vehicle. The vehicle includes a single solid axle 14 having its left end portion connected in a conventional manner with the wheel assembly 12 for vehicle steering movement of the wheel about the generally vertical turning axis of a king pin, not shown, journalled by the end portion of the axle. The vehicle steering apparatus includes a steering control arm 16 connected at one end with the wheel mounting members and connected at its other end with the steering shaft, indicated generally at 18. The vehicle steering apparatus further includes a generally horizontal pitman arm 20 intersecting the turning axis and extending in a generally forward and rearward direction with its forward end portion secured to the wheel mounting members by a nut 22. The rearward end portion of the pitman arm 20 is pivotally connected with one end of a tie rod 24 which projects toward and is connected with the other or right hand steerable wheel pitman arm, neither of which are shown, so that when the steering control arm 16 is moved both steerable wheels move in unison. The vehicle further includes a leaf spring assembly 26 overlying, intermediate its ends, the upper surface of the axle 14 with a pillow block 28 interposed between the axle and leaf springs. The leaf springs are rigidly secured to the axle by forward and rearward inverted U-shaped spring clamp bolts 30 and 32 with the threaded leg ends of the spring clamp bolts 30 and 32 extending through suitable flanged edge portions 34 and 36 of the axle and secured by nuts 38 and 40, respectively. The wheel steering members and vehicle suspension components numbered 12 through 40 are substantially conventional with single axle vehicles and is set forth to show the relationship and manner of mounting the steering stabilizing apparatus 10 on such a vehicle.

The steering stabilizer apparatus 10 comprises a left hand pitman mounting bracket means 42, a fixed mounting bracket means 44 and a spring assembly 46. The pitman mounting bracket means 42 comprises an elongated flat plate 48 having a lateral cut-out or recess 50 in one of its longitudinal sides to accommodate the wheel mounting components and is provided with an aperture 52 adjacent its forward end 54 for the purposes presently explained.

Intermediate its ends the plate 48 is provided with an upstanding ear 56 having an opening 58 therein for receiving the forward end portion of the pitman arm 20, after removing its connecting nut 22, when the plate 48 is horizontally disposed below the pitman arm 20. The rearward end portion of the plate 48 is provided with laterally spaced apertures for receiving the legs of an inverted U-shaped clamp 60 which overlies in partially surrounding relation the rearward end portion of the pitman arm 20 and is held in place by clamp nuts 62 to further secure the plate 48 to the pitman arm. A leveling lug 64 overlies the bracket plate 48 between the legs of the clamp 60. A right hand pitman arm mounting bracket means, not shown, which is a mirror image of the bracket means 42, is provided for the right hand steerable wheel.

The fixed mounting bracket means 44 comprises a section of angle iron having one of its legs 66 horizontally underlying the axle forward flange 34 and provided with suitable apertures for receiving the depending leg end portions of the spring clamp bolt 30 after removing its nuts 38 which are replaced when the bracket leg 66 is connected therewith (FIGS. 3 and 4). A prong 68, formed by a section of L-shaped metal, is secured, as by flatly welding its leg 70 to the forward vertical surface of the other leg 72 of the mounting bracket 44. The depending edge of the fixed bracket leg 72 or the prong 68 is preferably no lower than a horizontal plane defined by the lowermost surface of the vehicle axle 14. The other vertically disposed leg 74 of the prong, normal to the longitudinal axis of the axle 14, is centrally apertured, as at 76, for slidably receiving an intermediate portion of an elongated shaft 78 forming a part of the spring assembly means 46. One end of the shaft 78 is threadedly connected with one end portion of a sleeve 80 in turn threadedly connected, at its other end, with a stub shaft 82 forming a part of a ball joint-type universal joint 84. The prong 68 is preferably welded to the fixed bracket leg 72 after connecting the universal joint 84 with the pitman bracket 42 to insure free reciprocating movement of the shaft 78 relative to the prong. The universal joint means 84 includes a stub bolt 86 which enters the pitman bracket aperture 52 and is secured thereto by a nut 88. The universal joint 84 thus provides relative movement in any direction of the spring shaft 78 relative to the pitman bracket means 42. Obviously, any type universal joint may be used for connecting the shaft 78 to the pitman bracket means 42.

A pair of compression springs 90 and 92 surround the respective end portions of the shaft 78 on opposing sides of the apertured prong 68. The springs 90 and 92 are preferably formed from chrome vanadium steel. The springs 90 and 92 are placed under a desired compression by pairs of spring retainer nuts 94 and 96 threadedly received by the respective end portions of the shaft 78.

OPERATION

In operation, the vehicle steerable wheel and steering control members are disposed in a neutral position prior to installation of the stabilizing apparatus 10. The stabilizer apparatus is connected with the pitman arm 20 and forward spring mounting bolt 30, as described hereinabove, on both steerable wheels of the vehicle. Thereafter, any turning movement of the wheels about its turning axis, as by movement of the steering control arm 16 or objects encountered on the roadway, is resisted by one or the other of the springs 90 and 92. For example, if the wheel assembly 12 is turned to the left, as viewed in the drawings, the spring 90 is compressed and tends to return the wheel to a neutral forward direction when released. Conversely, if the wheel 12 is turned to the right, as viewed in the drawings, the spring 92 is compressed. Further, in the event one end of the tie rod 24 separates from the respective pitman arm while the vehicle is being driven, control of the vehicle is faciliated by the action of the springs tending to maintain each of the steerable wheels in a forward neutral position.

Obviously the invention is susceptible to changes or alterations without defeating its practicability. Therefore, I do not wish to be confined to the preferred embodiment shown in the drawings and described herein.

I claim:

1. In a vehicle having a single piece front axle journalling a steerable wheel assembly for horizontal turning movement about a generally vertical axis by a steering control arm connected with the wheel assembly including a pitman arm horizontally intersecting the turning axis and movable about the turning axis in unison with turning movement of the steerable wheel assembly and having a leaf spring assembly overlying the axle and secured thereto by a spring clamp bolt, the improvement comprising:

pitman bracket means rigidly secured to said pitman arm and having an apertured end portion projecting forwardly of said turning axis,
  said pitman bracket means comprising an elongated plate longitudinally underlying said pitman arm,
  an apertured ear transversely secured to said plate intermediate its ends in upstanding relation for surrounding one end portion of said pitman arm, and,
  a clamp connecting the other end portion of said pitman arm to said plate;
fixed bracket means including an apertured prong supported by said spring clamp bolt forwardly of said axle;
spring assembly means including a shaft supported intermediate its ends by said apertured prong for longitudinal reciprocating movement relative thereto,
  said spring assembly means including a pair of compression springs respectively surrounding opposing end portions of said shaft on opposing sides of said apertured prong, and,
  spring retaining means on the respective end portion of said shaft for adjusting the compression of said springs; and,
universal joint means connecting one end portion of said shaft with the apertured end portion of said pitman arm bracket means.

2. The combination according to claim 1 in which said fixed bracket means comprises:
an angle iron member having apertures in one of its legs for receiving said spring clamp bolt and having its other leg vertically disposed parallel with respect to the longitudinal axis of said axle; and,
an L-shaped member having one of its legs flatly secured to said other angle iron leg with the other L-shaped member leg vertically disposed edgewise.

3. The combination according to claim 2 and further including:
a sleeve connecting said one end portion of said shaft with said universal joint means.

* * * * *